June 13, 1972  W. CYRIAX  3,669,593
MOLD-CLOSING MEANS FOR MOLDING MACHINES
Filed Feb. 10, 1970  9 Sheets-Sheet 5
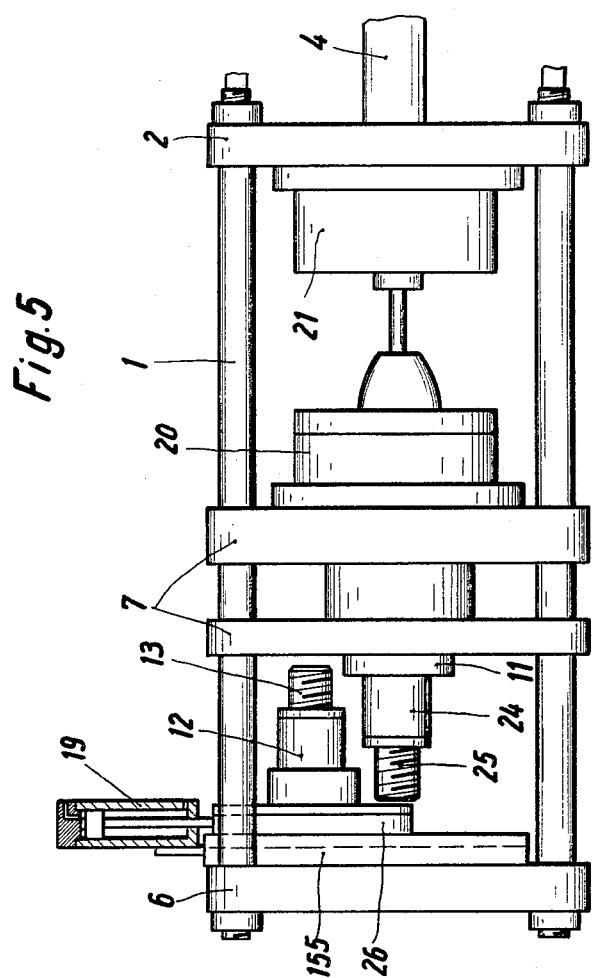
WILHELM CYRIAX
*Inventor:*
by
Attorney

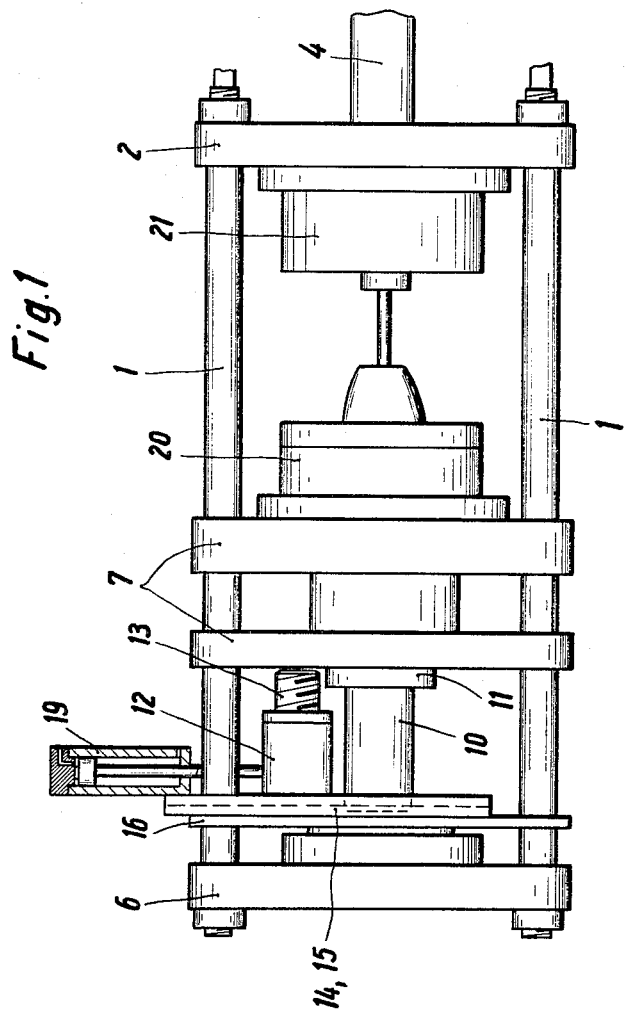

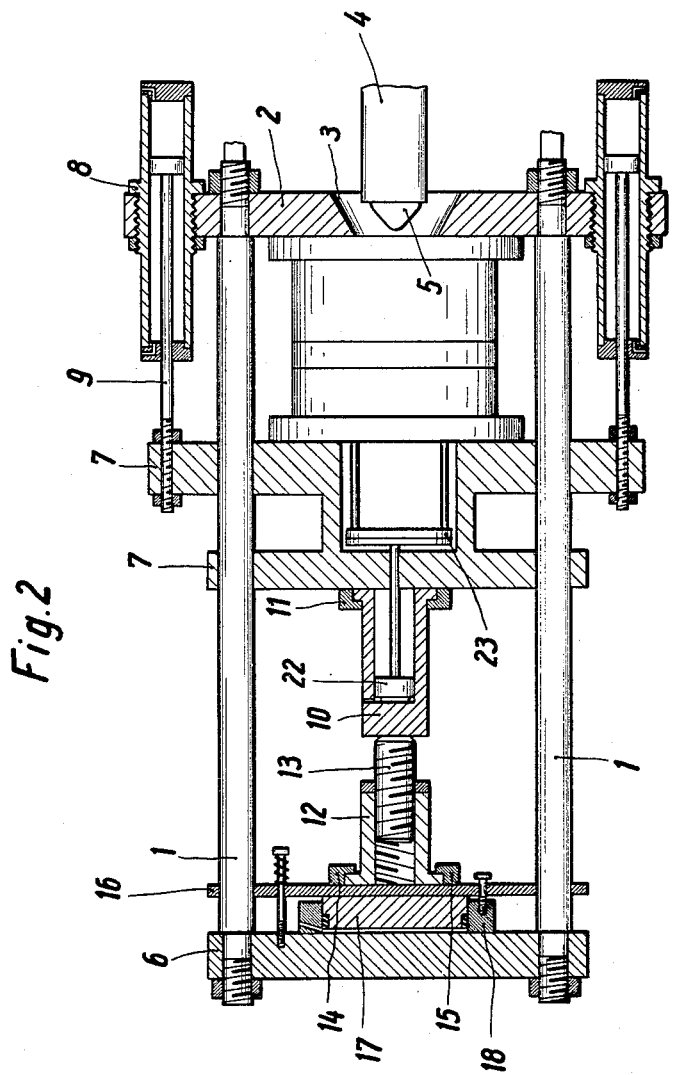

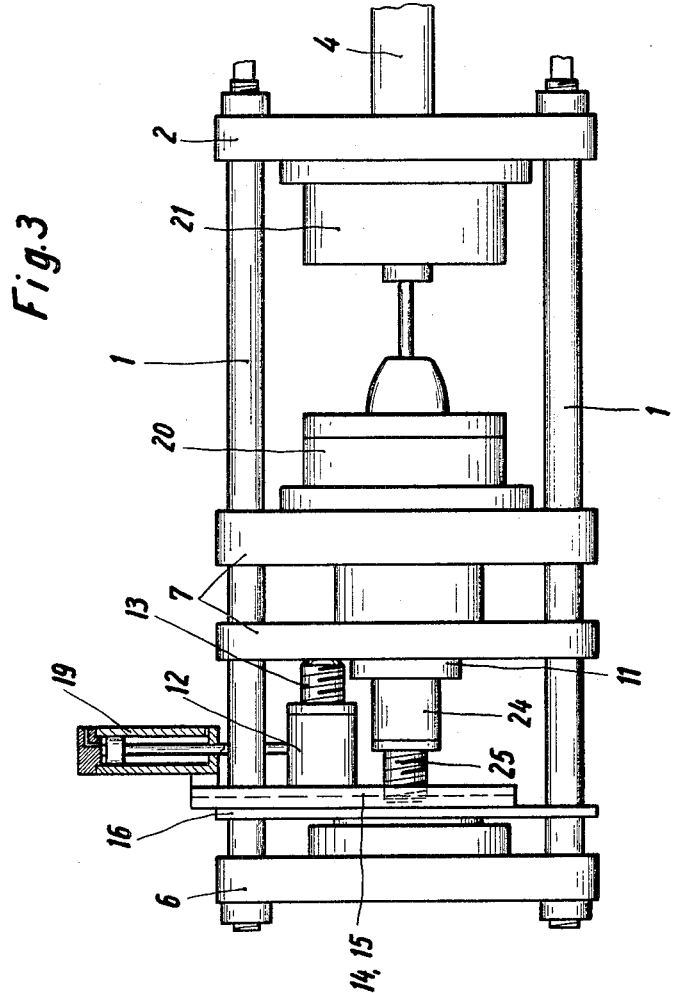

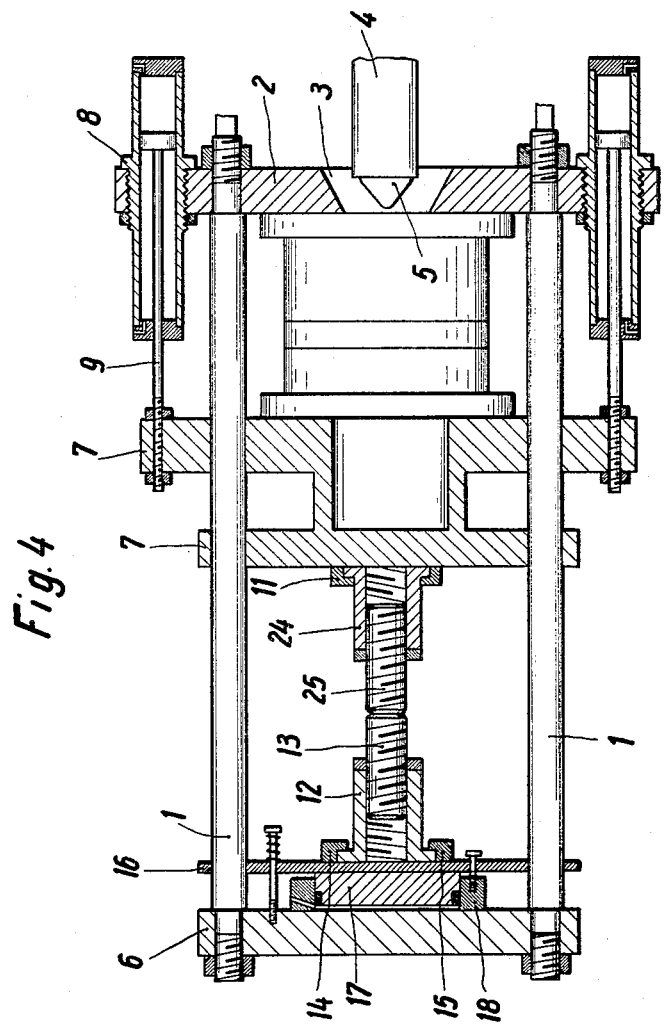

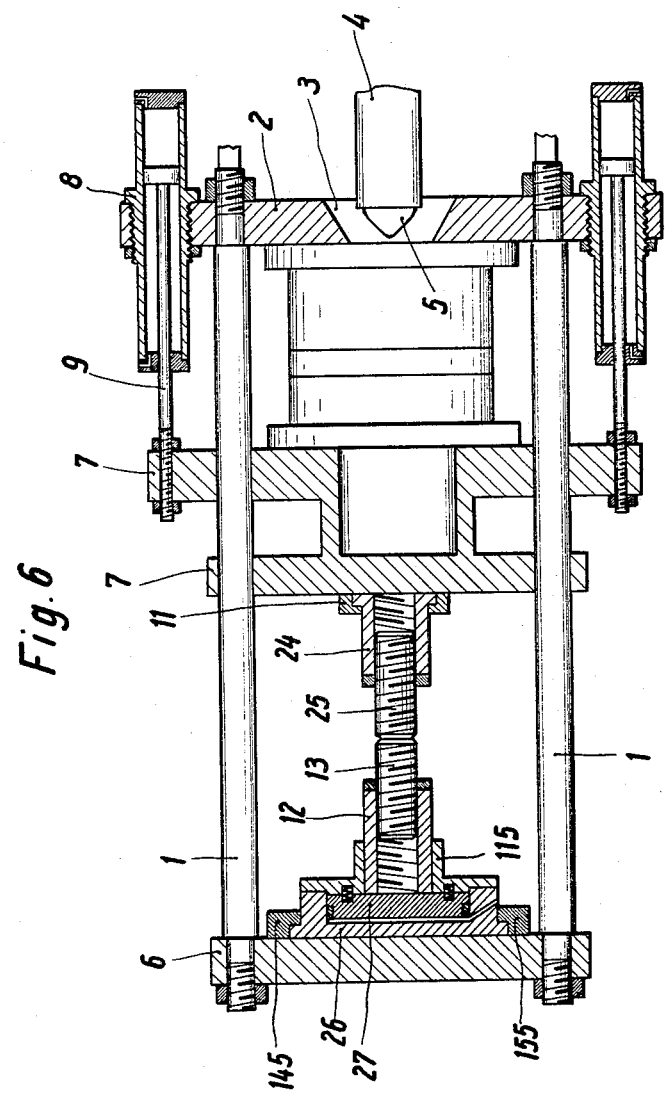

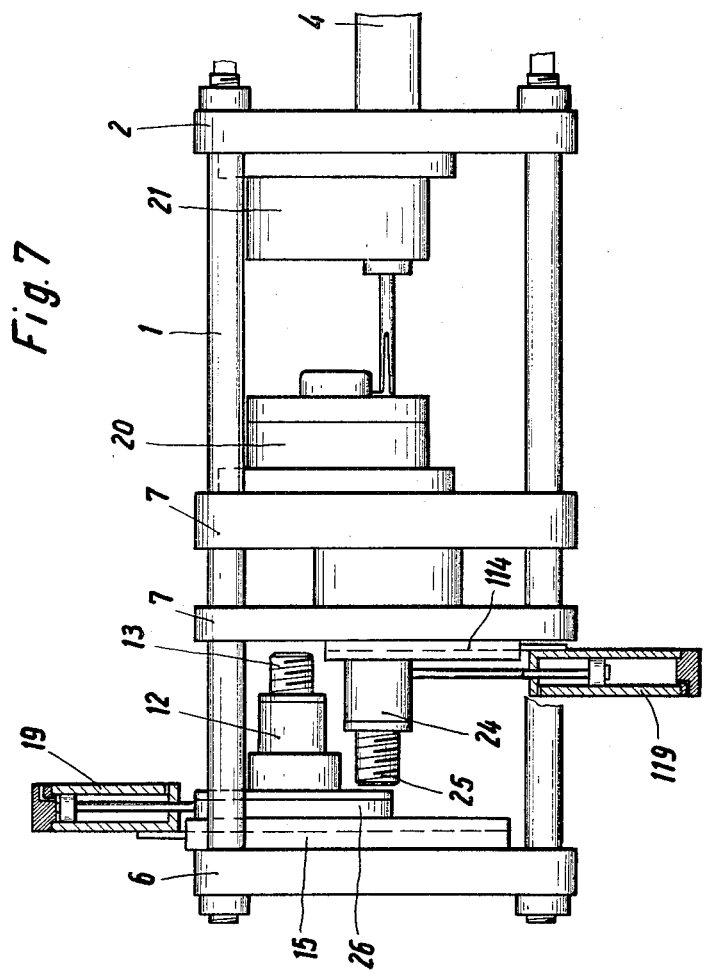

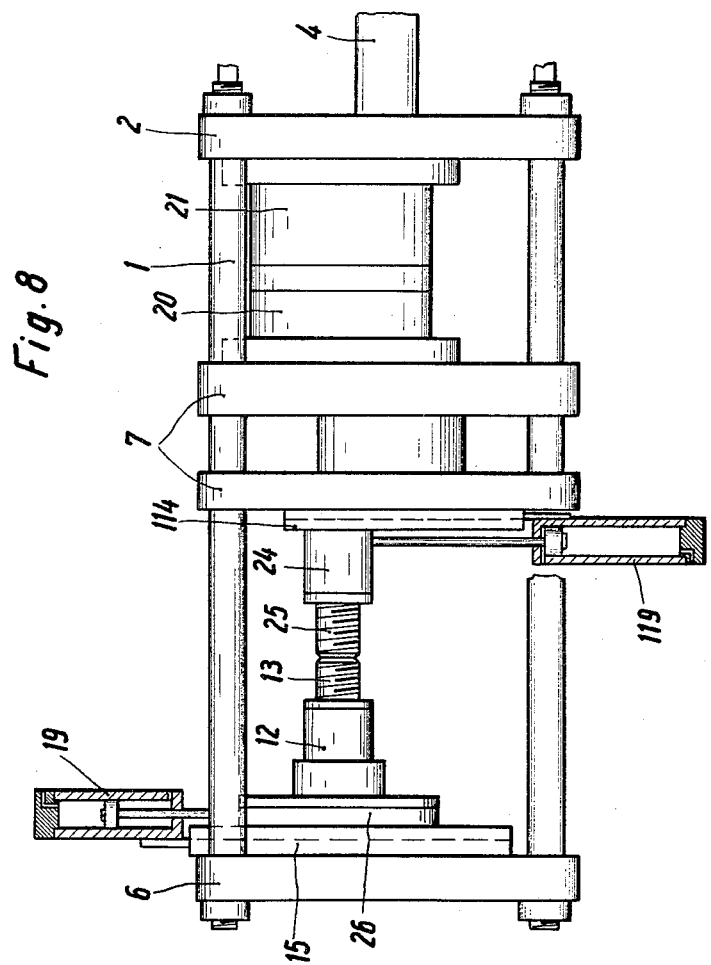

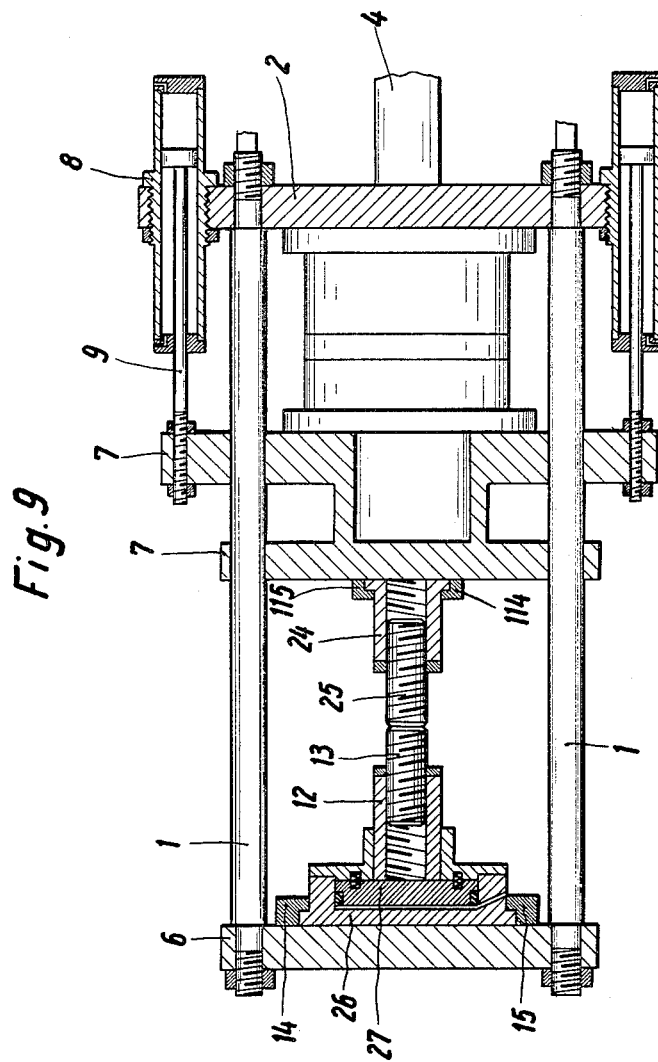

United States Patent Office 3,669,593
Patented June 13, 1972

3,669,593
MOLD-CLOSING MEANS FOR MOLDING MACHINES
Wilhelm Cyriax, W.R. Neustadterstrasse 81, Kottingbrunn, Austria
Filed Feb. 10, 1970, Ser. No. 10,235
Int. Cl. B29f 1/06
U.S. Cl. 425—186
10 Claims

ABSTRACT OF THE DISCLOSURE

A machine for compression or injection molding has a fluid-operated pressure intensifier inserted between a fixed end plate and a movable platen riding on tie bars between that end plate and a co-operating stationary platen, the pressure intensifier acting through an interposed pressure piece upon closure of the mold formed by two halves carried on these platens. The pressure piece consists of two parts of substantially the same axial length, either or both of which may be extensible, at least one of which is slidably guided for transverse movement out of alignment with the other part preparatorily to an opening of the mold. With the mold open, the two parts lie alongside each other in the space between the end plate and the movable platen.

---

This invention relates to a mold-closing device, particularly for die-casting and injection molding machines, for metals or plastics.

Mold-closing devices are known which have a stationary mold-carrier plate or platen anchored to a set of tie bars, a stationary end plate and a mold-carrier plate or platen movable between these two stationary plates from an open position into a closed position.

In one form of construction of such devices it is known to provide two piston-and-cylinder units which are attached to the stationary mold platen or to the end plate, and which carry out the closing and opening movements of the mold with a comparatively low pressure. For the attainment of the raised closing pressure which is requisite during the injection process there is provided, between the movable mold platen and the end plate, a pressure piece equipped with a pressure box or hydraulic end plate and the movable mould-carrier late only during the injection operation.

In the case of one such device, equipped with lateral closing cylinders for the mold movable platen (German printed specification No. 1,127,069), there is a pressure box secured to the end plate, a pressure piece for the transmission of the mold-closing pressure to the platen being laterally swingable to enable the mold to be opened. In this case the pressure piece is mounted with a pivot bearing upon one of the four tie bars. To enable the mold to be opened, the pressure piece must be swung out of reach of the end plate. This requisite rocking of the pressure piece away from the end plate is disadvantageous inasmuch as the distance between the tie bars has to be so dimensioned that the pressure piece, when being swung out, can be carried past a tie bar which is adjacent to the one that is carrying the pivot bearing. This requires a rectangular arrangement of the four tie bars which would otherwise be superfluous and is necessitated only by the swung radius of the pressure piece.

This right-angled arrangement of the tie bars requires that there be platen and an end plate of corresponding size, whereby additional expenditure in production is involved, since on account of the increased beam spacing the plates have to be made correspondingly stouter, in order reliably to prevent sagging. A further disadvantage of this known form of construction resides in the fact that the pivot bearing of the pressure piece has to be so arranged as to be axially displaceable on the tie bar, in order that the pressure box may be able to come into action. In addition to this, with a horizontally arranged pressure piece, the latter, after the relieving of the pressure box for the purpose of releasing the movable platen, has to be retracted by an additional member in order to render the rocking movement possible and to enable the mold to be opened.

A further disadvantage of this known construction disposed, with a horizontally located pressure piece, resides in the fact that, owing to the short length of the pivot bearing and its axial displaceability, the pressure piece may tilt or cant, which leads to a jamming of the pivot bearing on the tie bar. Yet another disadvantage resides in the fact that the pressure box is saddled with the problem of bridging, with a pressure piece of fixed length, the differences in length arising from the different opening widths of the mold. This renders necessary a pressure box of large stroke range, so that the closing pressure, for a given height of the mold, has to be transmitted through a large column of pressure fluid. In this case, however, on account of the compressibility of the pressure fluid, a substantially greater quantity of fluid is needed than corresponds to the stroke length actually required. The same disadvantage is also experienced if the pressure piece is constructed, as is already known, as a piston-and-cylinder unit or jack.

Furthermore a construction has become known from German printed specification No. 1,006,590, in which the pressure box is displaceable transversely to the end plate in order to clear the path for the pressure piece mounted on the pressure side of the movable platen. In this known form of construction there is the necessity to provide, in the end plate, a gap corresponding to the dimensions of the pressure piece, in order that the pressure piece may be able to pass through the stationary end plate when the mold is opened. This requisite discontinuity of the end plate involves however a considerable weakening of that plate, which in its turn renders necessary a sufficiently heavy construction of the bottom of the movably mounted pressure box.

The present invention has the object of obviating the disadvantages inherent in the known constructions, and of providing a mold-closing device in which, on the one hand, the pressure piece, for the purpose of opening the mold, does not have to be moved out of reach of the end plate, in which, on the other hand, the provision of a gap in the end plate for the passage of the pressure piece is not required, and wherein, moreover, a sufficiently long guide for the pressure piece is provided to obviate the risk of canting or jamming.

According to the invention I divide the pressure piece into two parts respectively mounted on the movable platen and on the end plate; one part of the pressure piece is transversely displaceable on its support and is also variable in its length, for instance by means of a screw-and-nut arrangement. This makes it possible, for the purpose of opening the mold, to separate the two parts of the pressure piece by displacing one part out of its coaxial position, so that the two parts lie alongside and parallel to one another, thereby enabling the opening of the mold notwithstanding the fact that the pressure piece has not been moved beyond the reach of the end plate, and that no clearance therefor is provided in the end plate. Owing to the stepless extensibility of one part of the pressure piece, even with different mold-opening widths the pressure box always executes the same stroke since the total length of the pressure piece can be adjusted to the particular width of opening desired.

The two-part pressure-transmitting insert according to the invention allows the part associated with the movable platen to be provided with a hydraulic cylinder for the actuation of an ejector of the mold.

A further feature of the invention is the fact that the two parts of the pressure piece are variable in their length in such a way that when the mold is opened they span the distance between the end plate and the movable platen with equal axial clearance. By this feature of the invention a maximum opening path for the mould is ensured. With an increase in the height of the mold by, for instance, 100 mm, the two parts of the pressure piece are each shortened in their length by 50 mm, so that the possible opening path, with a given length of machine, is diminished only by 50 mm. Since any increase in the axial length of the mold amounts here only to a reduction of the opening path corresponding to half that length longer molds can be accommodated, and therefore larger articles can be produced. A further feature of the invention resides in the fact that the pressure box is fixedly mounted on the end plate or on the movable platen, either part of the pressure piece being transversely displaceable.

In another embodiment of my invention, the pressure box together with the associated part of the pressure piece is transversely displaceable on the end plate or on the movable platen. In this case the part of the pressure piece not associated with the pressure box is advantageously also transversely displaceable in the same plane, each part being thus shiftable into either an axial position or an off-axial position. With this embodiment the pressure box may also be offset in relation to the end plate, which is advantageous with lateral injection in the plane of separation of the mold portions, since here the cavity formed by the two mold halves lies outside the centerline of the movable platen. With such systems, and with a central arrangement of the pressure piece, the mold itself would have to be made unduly large, since it would have to be arranged symmetrically about the mold axis.

Finally, it is also possible to make the parts of the pressure piece oppositely displaceable. If the two coaxially arranged parts of the pressure piece have to be moved out of their aligned position for the opening of the mold, the opposite mobility of the two parts requires each of them to shift through only half the path of their relative displacement, thereby enabling faster operation.

Representative embodiments of the invention are illustrated in the accompanying drawing, in which:

FIG. 1 shows a side view of a mold-closing device according to the invention, in which the closing cylinder located in front is omitted, the movable part of the pressure piece being extensible and mounted on a stationary pressure box, the other part of the pressure piece being constructed as a bolt;

FIG. 2 shows a horizontal section of the device shown in FIG. 1, taken in the plane of the tie bars;

FIG. 3 shows a view similar to FIG. 1, in which the part of the pressure piece carried on the movable platen is also variable in length;

FIG. 4 shows a horizontal section of the device of FIG. 3, taken in the plane of the tie bars;

FIG. 5 is a view similar to FIG. 3, in which the pressure box along with the associated part of the pressure piece is transversely displaceable;

FIG. 6 shows a horizontal section through FIG. 5, taken in the plane of the tie bars;

FIG. 7 shows a view similar to FIG. 5, in which both parts of the pressure piece are transversely displaceable and the mold is eccentrically arranged;

FIG. 8 shows the assembly of FIG. 7 with the mold closed; and

FIG. 9 shows a horizontal section through the device of FIG. 8, taken in the plane of the tie bars.

FIGS. 1, 3, 5 and 7 shows injection-molding machines with the mold opened, and FIGS. 2, 4, 6, 8 and 9 show the same with the mold closed. Tie bars 1 are anchored at one end to a stationary platen 2 which is provided with a central aperture 3 for an injection cylinder 4 with injection nozzle 5. At the opposite end of the tie bars 7 there is provided a likewise stationary end plate 6. Between the stationary platen 2 and the end plate 6 a movable platen 7 rides on the tie bars. For the opening and closing of the mold by a reciprocation of platen 7, there are provided on the stationary platen 2 two cylinders 8 whose piston rods 9 are secured to the movable platen 7.

According to FIGS. 1 and 2 a ram 10 forming one part of a pressure piece is arranged on the pressure side of the movable platen 7 and is secured in an annular collar 11. The second part 12 of the pressure pieces is a screw-threaded sleeve matingly receiving a bolt 13 whereby the effective length this part can be varied. The part 12 is accommodated in grooved guiding rails 14 and 15 secured to a supporting plate 16 which is slidably mounted on the tie bars 1 and which carries the piston 17 of a pressure box 18 mounted on the end plate 6. The displacement of the pressure-piece part 12 in the guiding grooves of rails 14 and 15 is effected by a piston-and-cylinder unit or jack 19 whose cylinder is secured to the supporting plate 16 while its piston is laterally attached to the pressure-piece part 12. The threaded bolt 13 in the part 12 permits a continuous or stepless extension of that part to the particular axial length of the mold determined by the thickness of mold halves 20 and 21, so that the pressure box 18 always need only execute a constant stroke. Before the mold is opened, the part 12 is moved out of the position shown in FIG. 2, in which it is coaxial with the part 10, into the non-coaxial position shown in FIG. 1 by actuating the piston-and-cylinder unit 19, the pressure-piece part 12 remaining within the range of the end plate 6. After the closing of the mold, the part 12 of the pressure piece is moved back from its off-axial position shown in FIG. 1 into the position coaxial with the pressure-piece part 10, whereupon the pressure box 18 is subjected to fluid pressure transmitted by way of the pressure-piece parts 12 and 10 to the movable platen 7. The ram 10 contains a hydraulic cylinder 22 for actuating an ejector plate 23.

The embodiment shown in FIGS. 3 and 4 corresponds to that shown in FIGS. 1 and 2, with the exception that the ram 10 forming part of the pressure-piece assembly of FIGS. 1 and 2 is replaced by a sleeve 24 of variable effective length, this sleeve being screw-threaded and mating with a screw-threaded bolt 25 similar to the bolt 13 also shown in FIGS. 1 and 2. When relatively heavy mold halves 20 and 21 are being used, the two threaded bolts 25 and 13 are screwed into the two threaded sleeves or nuts 24 and 12, each to an extent equal to half the total increase in mold length. By this means the result is obtained that in the open position of the mold halves 20 and 21, shown in FIG. 3, each of the two pressure-piece halves 24, 25 and 12, 13 spans an equal share of the space between the guiding plate 16 and the movable platen 7, so that between the end face of the threaded bolt 13 and the movable platen 7, on the one hand, and between the end face of the threaded bolt 25 and the supporting plate 16, on the other hand, there is the same clearance.

The embodiment of FIGS. 5 and 6 corresponds to that of FIGS. 3 and 4, with the exception that the grooved guide rails here, designated, 145 and 155, are secured to the end plate 6 on which the pressure box here labeled 26 is slidably mounted. The piston 27 of this pressure box supports, by means of an annular collar 115 serving as a guide, the part 12 of the pressure piece. The piston of the piston-and-cylinder unit 19 is here attached laterally to the pressure box 26.

The embodiment according to FIGS. 7 to 9 corresponds to that of FIGS. 5 and 6, with the exception that here again the half 24, 25 of the pressure piece, mounted on the movable platen 7 is transversely displaceable in the same radial plane as the other half 12, 13 of that piece. For this purpose the annular collar 11 of FIGS. 3 and 4 is replaced by grooved guide rails 114, 115, which are parallel to the guide rails 14 and 15. The movable platen 7 carries the cylinder of the piston-and-cylinder unit 119 whose piston is attached laterally to the threaded sleeve 24. Owing to the displaceability of the parts 12, 13 and 24, 25 of the pressure piece, the movable platen may be eccentrically loaded by the pressure box 26, should this be required. In this case, by simultaneous and uniform actuation of the piston-and-cylinder units 119 and 19, the half 12, and 13 of the pressure piece, together with the pressure box 26 and the other half 24, 25 of that piece will be slid out of their axial position. When the mold is to be opened, either of the two pressure-piece parts is moved out of its axial position until it is located beside the other pressure-piece part, or else the two pressure-piece parts are moved at the same time and in opposite directions, in which case each pressure-piece part need traverse only half the length of their relative displacement.

I claim:

1. In a molding machine having a fixed, solid end member, a stationary platen remote from said end member, tie bars anchored to said stationary platen and to said end member, a movable platen riding on said tie bars between said end member and said stationary platen, and mechanism for reciprocating said movable platen to open and close a mold having complementary portions supported on said platens, the combination therewith of:

fluid-operable pressure-intensifying means in a space between said end member and said movable platen;

pressure-transmitting means in said space including a first part and a second part of substantially the same axial length alignedly positionable in line with said pressure-intensifying means in a position of substantial mold closure for exerting a supplemental closing pressure upon said movable platen, said parts being relatively movable both axially and transversely;

guide means in said space for at least one of said parts enabling transverse displacement thereof into disalignment with the other of said parts preparatorily to an opening of the mold; and control means coupled with said one of said parts for so displacing same within said space to place them alongside each other between said end member and said movable platen in a position of mold opening.

2. The combination defined in claim 1 wherein at least said first part is of adjustable length.

3. The combination defined in claim 2 wherein said first part comprises a threaded sleeve and a mating bolt projecting from said sleeve.

4. The combination defined in claim 2 wherein each of said parts comprises a threaded sleeve and a mating bolt projecting from said sleeve.

5. The combination defined in claim 1 wherein said guide means comprises a supporting plate riding on said tie bars between said end member and said movable platen, said supporting plate being provided with transverse rail means slidably guiding said one of said parts.

6. The combination defined in claim 5 wherein said pressure-intensifying means comprises a pressure-intensifying means comprises a pressure box interposed between said end member and said supporting plate, said parts being respectively carried by said supporting plate and said movable platen.

7. The combination defined in claim 5 wherein said pressure-intensifying means comprises a pressure box rigid with said one of said parts and displaceable jointly therewith along said rail means.

8. The combination defined in claim 1 wherein said guide means comprises transverse rail means on said movable platen slidably engaging said one of said parts.

9. The combination defined in claim 1 wherein said first part and said second part are respectively secured to said end member and to said movable platen.

10. The combination defined in claim 9 wherein said control means includes separate actuators for oppositely shifting said parts in a common radial plane with reference to said end member and said movable platen.

References Cited

UNITED STATES PATENTS

| | | | |
|---|---|---|---|
| 3,091,810 | 6/1963 | Turner | 18—20 H X |
| 3,345,691 | 10/1967 | Aoki | 18—30 LV |
| 2,618,823 | 11/1952 | Perkon | 18—30 LA X |
| 3,049,757 | 8/1962 | Hagerborg | 18—30 LT UX |
| 3,528,134 | 9/1970 | Fischbach | 18—30 LV |

FOREIGN PATENTS

| | | | |
|---|---|---|---|
| 1,006,590 | 4/1957 | Germany | 18—30 LV |
| 1,456,775 | 10/1966 | France | 18—30 LV |
| 912,866 | 12/1962 | Great Britain | 18—30 LV |
| 79,492 | 10/1962 | France | 18—30 LV |
| 1,127,069 | 4/1962 | Germany | 18—30 LV |
| 1,404,585 | 5/1965 | France | 18—30 LV |

J. HOWARD FLINT, JR., Primary Examiner

U.S. Cl. X.R.

425—242, 450